Nov. 22, 1955 E. F. OSCHMANN 2,724,802
FREQUENCY MODULATED OSCILLATOR
Filed March 5, 1953
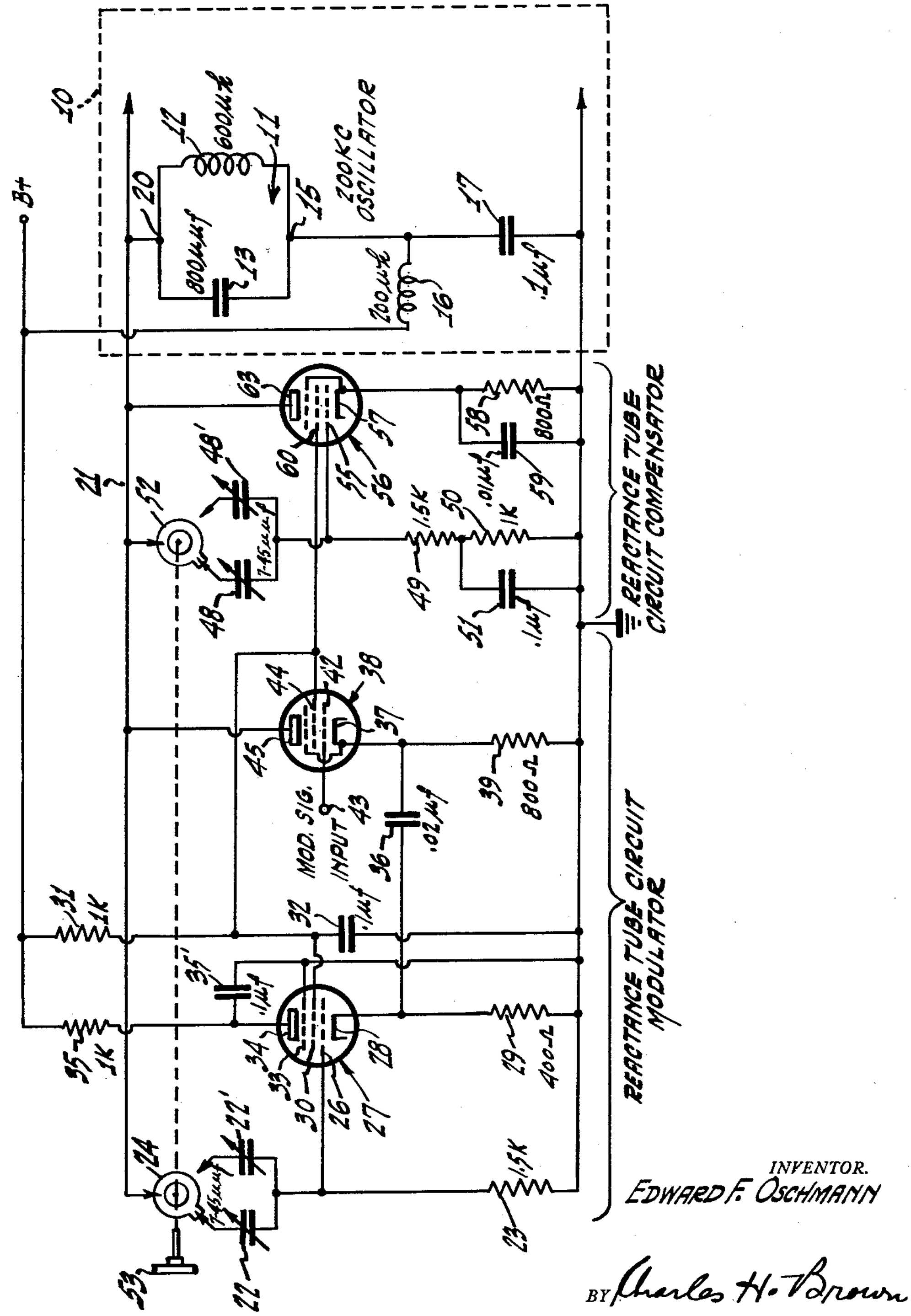
INVENTOR.
EDWARD F. OSCHMANN
BY Charles H. Brown
ATTORNEY

United States Patent Office 2,724,802

Patented Nov. 22, 1955

2,724,802

FREQUENCY MODULATED OSCILLATOR

Edward F. Oschmann, Brooklyn, N. Y., assignor to Radio Corporation of America, a corporation of Delaware Application March 5, 1953, Serial No. 340,519

5 Claims. (Cl. 332—28)

This invention relates to frequency modulated oscillators, and more particularly to oscillators wherein the output frequency varies in accordance with an input voltage applied to a reactance tube circuit acting in shunt with the oscillator circuit.

This invention is particularly useful in a radio transmitter as a frequency shift keyer. A frequency shift keyer is used to provide an output signal (at a frequency such as 200 kilocycles) which shifts in frequency in response to an applied signal from a telegraph key, for example. A frequency shift keyer also may be used to provide an output signal the frequency of which varies in accordance with the voltage of a signal representative of variations in density of graphic material scanned by a photoelectric cell. If the graphic material is a halftone photograph, it is particularly important that the amount of the frequency shift be a linear function of the graphic density of the photograph so that the image can be faithfully reproduced at the receiving point. The output of the frequency shift keyer, which may be a 200 kilocycle wave which shifts over the range of plus and minus one kilocycle in frequency in accordance with the input signal, is amplified and multiplied in frequency in the transmitter to produce a radio-frequency carrier wave which is radiated from an antenna structure to distant points.

It is an object of this invention to provide an improved frequency modulated oscillator which has an output frequency which varies linearly with an input signal.

It is another object to provide an improved frequency modulated oscillator which is very stable and which maintains a predetermined relationship between input voltage and output frequency in spite of aging effects in the vacuum tubes and variations in screen grid and filament voltage supplies.

It is a further object to provide an improved frequency modulated oscillator which conveniently can be switched to produce different amounts of frequency shift in response to a predetermined value of modulating signal.

In one aspect, the invention comprises an oscillator circuit including a tank circuit in the form of an inductor and capacitor electrically connected in parallel relationship. The tank is coupled through a phase shifting capacitor-resistor circuit and a cathode follower tube to the cathode of a reactance modulator tube. An input modulating voltage is applied to the control grid of the reactance modulator tube. The input voltage varies the current drawn by the plate of the modulator tube which is in shunt with the oscillator circuit. The current drawn from the tank by the modulator tube is an inductive current, i. e., the current lags the voltage across the tank. The modulator tube thus injects inductance into the tank which varies the output frequency of the oscillator. A reactance tube circuit compensator provides a capacitive reactance which balances the inductive reactance of the modulator tube in the absence of an input modulating signal. The reactance of the modulator tube and the output frequency increases with input signal from the reference value provided by the compensator tube. The compensator tube compensates for aging effects in the tubes and for variations in screen grid and filament voltages.

Other objects, advantages and aspects of the invention will be apparent to those skilled in the art from the following description taken together with the appended drawing showing a simplified diagram of a frequency modulated oscillator constructed according to the teachings of this invention.

A conventional oscillator circuit 10 is represented by a dotted line box including a tank circuit 11 comprising an inductor 12 and a capacitor 13 connected in parallel. The vacuum tube of the oscillator which is coupled to the tank circuit is not shown. One side 15 of tank 11 is connected through a radio frequency choke 16 to the B+ (positive) terminal of a source of unidirectional current (not shown). The negative terminal of the source is connected to ground. A D.-C. blocking capacitor 17 connects the end 15 of tank 11 to ground so far as the radio frequency oscillations are concerned.

The radio frequency high potential end 20 of tank 11 is connected over lead 21 to a series capacitor-resistor phase shifting circuit comprising capacitor 22 and resistor 23. A wafer switch 24 permits the substitution of a capacitor 22' for the capacitor 22 in the capacitor-resistor circuit. Since one end of resistor 23 is connected to ground, it is apparent that the capacitor-resistor circuit 22, 23 is effectively in parallel with oscillator tank 11.

The voltage across resistor 23 (the output of the phase shift circuit) is applied to the control grid 26 of a cathode follower vacuum tube 27 having a cathode 28 connected through a cathode resistor 29 to ground. A screen grid 30 is connected through a dropping resistor 31 to the B+ terminal and through a radio frequency by-pass capacitor 32 to ground. The suppressor grid 33 of tube 27 is connected to ground. The plate electrode 34 is connected through a plate resistor 35 to B+, and through a by-pass capacitor 35' to ground.

The output of cathode follower tube 27 is applied from the cathode 28 through a coupling capacitor 36 to the cathode 37 of a modulator vacuum tube 38. Cathode 37 is connected through a cathode resistor 39 to ground. The control grid 42 is connected to a modulating signal input terminal 43. The screen grid 44 is supplied with the same positive potential that is supplied to screen grid 30 of cathode follower 27. The plate 45 is connected through lead 21, inductor 12 of tank 11 and radio frequency choke 16 to B+.

The "hot" end 20 of tank 11 is connected over lead 21 through a second capacitor-resistor phase shift circuit to ground. The circuit includes, in series, a capacitor 48, a resistor 49 and a D. C. return resistor 50 by-passed by capacitor 51. A wafer switch 52 permits the substitution of a capacitor 48' for the capacitor 48 in the capacitor-resistor circuit. Wafer switches 24 and 52 may be on a common shaft controlled by a knob 53. The radio frequency voltage present across resistor 49 (the output of the phase shift circuit) is applied to the control grid 55 of compensator vacuum tube 56. The cathode 57 is connected through the cathode resistor 58 to ground, and also through radio frequency by-pass capacitor 59 to ground. The screen grid 60 is supplied with the same unidirectional positive voltage that is supplied to screen grid 30 of cathode follower 27 and screen grid 44 of modulator tube 38. The plate 63 of compensator tube 56 is connected through inductor 12 of tank 11 and radio frequency choke coil 16 to B+.

It will be noted that the capacitor-resistor circuit 48, 49 and the compensator tube 56 are connected to form a conventional reactance tube or quadrature circuit which influences the natural frequency of oscillation of tank 11.

The reactance tube circuit draws a leading current from the "hot" end 20 of tank 11 which effectively adds capacitance in parallel with tank capacitor 13, the value of the added capacitance being the product of the transconductance of tube 56, the capacitance of capacitor 48 and the resistance of resistor 49. The reactance tube circuit compensator adds a predetermined amount of capacitance in parallel with oscillator tank 11 to provide a reference condition for purposes which will appear as the description proceeds.

The capacitor-resistor circuit 22, 23, cathode follower tube 27 and modulator tube 38 are connected to provide a reactance tube circuit which is different from reactance tube circuits of the prior art in that a cathode follower tube 27 is inserted between the capacitor-resistor circuit and the reactance tube. The voltage across resistor 23 is applied through the cathode follower 27, without phase reversal, to the cathode 37 of modulator tube 38. Since the signal from resistor 23 of the capacitor-resistor circuit is applied to the cathode 37 of tube 38, rather than to the control grid, the tube 38 draws a lagging current from the tank 11. The modulator tube 38 therefore has the effect of adding inductance in parallel with inductor 12 in tank 11. The signal input circuit supplying modulation to the grid 42 of tube 38 is effectively isolated from the phase shifting network 22, 23 and is not adversely affected by the modulator tube 38. The reactance tube circuit modulator and the reactance tube circuit compensator therefore, have opposite effects on the natural frequency of oscillation of tank 11, and they may be adjusted to provide a reference frequency of oscillation when there is a predetermined reference voltage applied to modulating signal input terminal 43. Capacitors 22 and 48 are adjusted so that a reference voltage (such as 0.9 volt) applied to grid 42 of modulating tube 38 introduces an amount of inductance to tank 11 which is exactly balanced by the capacitance introduced by compensator tube 56 due to application of the same reference voltage to the junction between resistors 49 and 50. This adjustment is made preliminary to the use of the apparatus. During use of the apparatus, the only voltage applied thereto is the modulating voltage applied to terminal 43. When the modulating voltage applied to terminal 43 increases, effective inductance added in parallel with tank inductor 12 increases the resonant frequency of tank 11. Conversely, when the modulating voltage at terminal 43 decreases from the reference value, the resonant frequency of tank 11 is reduced.

In frequency modulated transmitters it is customary to generate a relatively low frequency oscillation, to modulate that oscillation and then multiply the frequency of the modulated oscillation until the frequency is translated to a high value suitable for radiation from an antenna to distant points. When it is desired that a transmitter be capable of transmitting modulated radio frequency energy at any one of a number of different widely-spaced radio frequencies, it is desirable to adjust the frequency swing of the low frequency oscillation due to a predetermined modulating signal so that regardless of the number of times the frequency is multiplied, the frequency swing of the radiated wave is a constant value. For example, if the desired output radio frequencies are to be any value between 2 and 32 megacycles with a frequency shift of plus and minus one kilocycle, the output of the 200 kilocycle oscillator which is shifted plus and minus one kilocycle may be heterodyned with a variable master oscillator to produce an output at any value between 2 and 4 megacycles with a frequency shift of plus and minus one kilocycle. The 200 kilocycle oscillator should be shifted plus and minus 500 cycles to produce, after heterodyning with the master oscillator, a doubled output of 4 to 8 megacycles shifted plus and minus one kilocycle. Similarly, the 200 kilocycle oscillator should be shifted plus and minus 250 cycles to produce, after heterodyning, a quadrupled output of 8 to 16 megacycles shifted plus and minus one kilocycle, and should be shifted 125 cycles to produce an eight-times multiplied output of 16 to 32 megacycles shifted plus and minus one kilocycle.

A reactance tube circuit involves a series reactor-resistor circuit connected in parallel with the tank circuit being acted upon. The reactor may be in the form of a capacitor or an inductor. There are four possible combinations of a reactor and a resistor in a reactance tube circuit. According to this invention it is possible to use capacitor-resistor circuits for both the modulator and the compensator circuits, to apply the voltage appearing across the resistor in each case to the grid of the reactance tube, and to conveniently switch between any one of a number of capacitors in the modulator and compensator circuits. It is more convenient and advantageous to switch capacitors than it is to switch inductors. The capacitors in the modulator and compensator circuits are switched in conformity with the switching which controls the number of times the modulated low frequency oscillation is multiplied so that a given modulating input voltage always results in the same amount of shift in the frequency of oscillation of the radiated carrier wave. This is conveniently done by means of metallic wafer switches 24 and 52 on a common shaft with switches controlling the frequency multiplying stages (not shown) which follow the oscillator, all controlled through a knob 53 or other mechanical means.

The construction whereby the voltage across the resistor 23 of the capacitor-resistor circuit is applied through a cathode follower tube to the cathode of modulator tube 38 has the advantage that the control grid 42 is available solely for the application of a modulating voltage. This provides a greater degree of stability of operation than can be had with conventional reactance tube circuits. The modulator tube does not load the circuit from which the modulating signal is obtained and a constant frequency deviation of the carrier is obtained for all frequency components of the input audio modulating signal.

What is claimed is:

1. A frequency modulated oscillator, comprising, an oscillator including a tank circuit, first and second vacuum tubes each having cathode, grid and plate electrodes, means coupling the cathode-plate paths of said tubes in parallel with said tank circuit, first and second similar capacitor-resistor phase shift circuits coupled in parallel with said tank circuit, a cathode follower circuit having an input coupled to the output of said first phase shift circuit and an output coupled to the cathode of said first vacuum tube, means coupling the output of said second phase shift circuit to the grid of said second vacuum tube, and means to apply a modulating signal to the grid of said first vacuum tube.

2. A frequency modulated oscillator as defined in claim 1 wherein the outputs of said phase shift circuits are taken across the resistors therein.

3. A frequency modulated oscillator as defined in claim 1, wherein each phase shift circuit includes a plurality of capacitors, and in addition, ganged switch means for selectively connecting said capacitors in said phase shift circuits.

4. A frequency modulated oscillator as defined in claim 1, wherein the capacitive portion of each of said phase shift circuits is variable, and means to simultaneously and equally vary said capacitive portions of both of said phase shift circuits.

5. A frequency shift keyer receptive to a given keying signal and operative to provide different predetermined absolute frequency shifts, comprising, an oscillator including a tank circuit, first and second vacuum tubes having cathode, grid and plate electrodes, means coupling the cathode-plate paths of said tubes in parallel with said tank circuit, first and second capacitor-resistor similar phase shift circuits coupled in parallel with said tank circuit, said phase shift circuits each including a plurality of capacitors and each including switch means by which any of the capacitors may be effectively inserted in the circuit, means to gang said two switch means, a cathode follower circuit having an input coupled to the output of said first phase shift circuit and an output coupled to the cathode of said first vacuum tube, means coupling the output of said second phase shift circuit to the grid of said second vacuum tube, and means to apply a modulating keying signal to the grid of said first vacuum tube.

References Cited in the file of this patent

UNITED STATES PATENTS

| | | |
|---|---|---|
| 2,248,132 | Smith | July 8, 1941 |
| 2,250,095 | Crosby | July 22, 1941 |
| 2,349,811 | Crosby | May 30, 1944 |
| 2,438,392 | Gerber | Mar. 23, 1948 |
| 2,521,694 | Crosby | Sept. 12, 1950 |